July 31, 1962 W. E. SOEHRMAN 3,046,814
POWER TRANSMISSION
Filed May 6, 1959 2 Sheets-Sheet 1
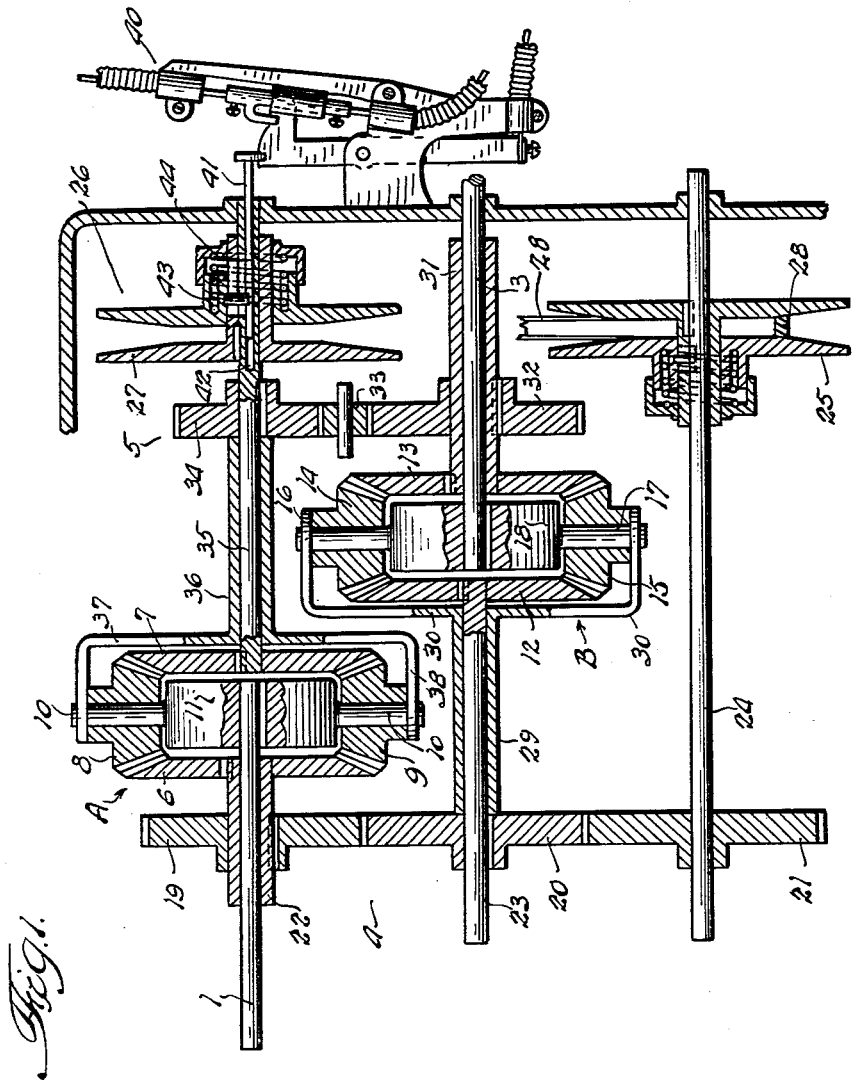
INVENTOR.
Walter E. Soehrman
BY.
Bertram Wm Coltman

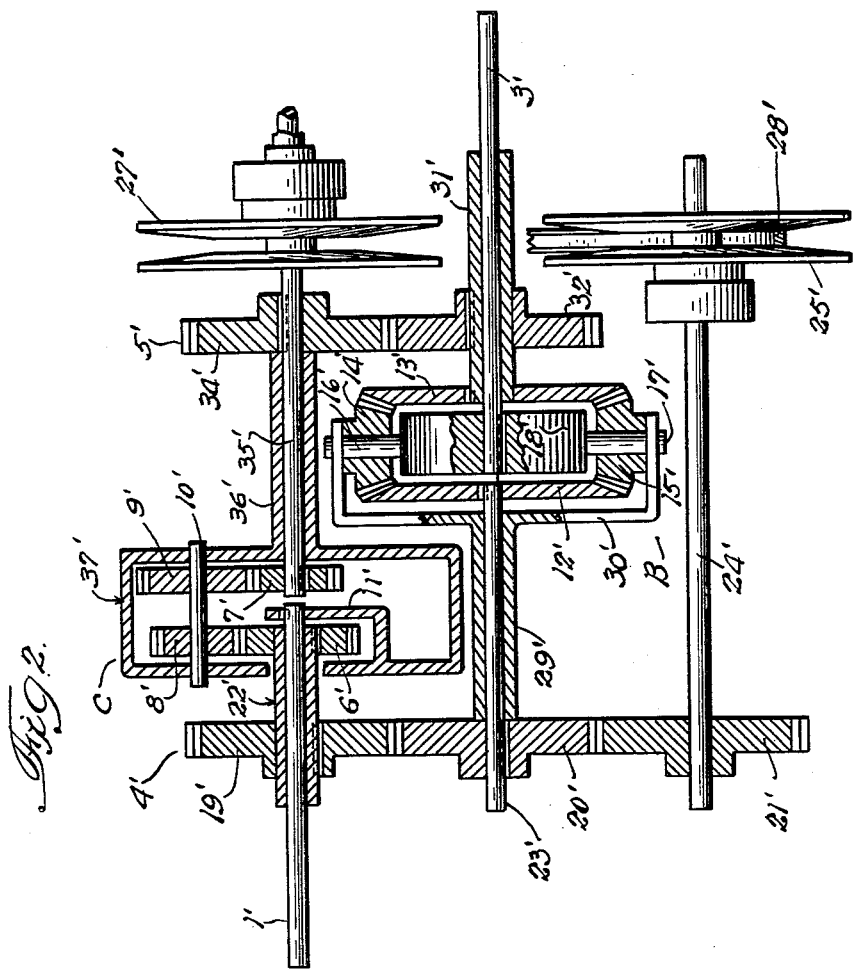

United States Patent Office 3,046,814
Patented July 31, 1962

3,046,814
POWER TRANSMISSION
Walter E. Soehrman, 1515 S. 3rd St., Lombard, Ill.
Filed May 6, 1959, Ser. No. 811,365
2 Claims. (Cl. 74—689)

This invention relates to power transmissions comprising essentially a power shaft and a load shaft, a power transmitting gearing unit and an accumulator gearing unit transmitting gearing unit and an accumulator gearing unit between the power and load shafts, two power transmitting connections, and means to control the relative speeds of the two power transmitting connections to cause the load shaft to remain at rest or to rotate in one of two directions.

Power transmissions of this class have heretofore been proposed using differential gearing units to transmit power to a load at variable speeds and a drive in the form of a variable speed-ratio device therebetween of the so-called Reeves type employing pulleys, a belt and an adjusting control to adjust the pulleys to equal diameters or to change the relative diameters of the pulleys so as to cause the load to be driven in a forward or reverse direction, and at a speed in either direction determined by the relation between the diameters of the pulleys, or brought to rest when the diameters of the pulleys are equal.

These prior power transmissions were capable only of low power output and with inherent loss that rendered them inefficient and costly to operate due to the fact that the arrangement of the gearing and the driving connections required a substantial part of the power to be transmitted through the belt and pulley device. In some cases, as high as 75% of the full power load was transmitted through the belt. Since the amount of power that a variable belt system is capable of transmitting is relatively low and the output of the transmission is correspondingly low, the efficiency was lowered to a point where the units were not practical or commercially useful.

An object of the present invention is to provide a power transmission with an improved arrangement of parts whereby substantially little, if any, of the power load is transmitted through the belt and pulleys of the direction control. This improved arrangement of parts reduces the loss of power heretofore experienced, increases the efficiency, and is capable of high power output so that the unit is practical, economical to use and has many new applications that the prior structures do not have.

A further object of the invention is to provide a power transmission of this type that is particularly efficient and economical to use.

A still further object of the invention is to provide a power transmission having an improved arrangement of gears and connections that effects a greatly improved operation and reduces power losses.

Basically, the invention relates to an improved variable speed transmission wherein the speed-ratio change is triggered by a variable system in the form of a belt and pulley system and practically all of the power is transmitted through slipless gears while a very small part, if any, of the load is shared by this belt and pulley system. Heavy loads may, therefore, be carried through a limitless speed-ratio change that includes infinity to one and beyond to reverse.

Other objects and advantages of the invention will be apparent from the following detailed description when taken in connection with the accompanying drawings, in which:

FIGURE 1 is a view somewhat diagrammatic, illustrating an embodiment of the invention; and FIG. 2 is a similar view but illustrating a modified embodiment of the invention.

Referring particularly to FIG. 1, the power transmission comprises input or power shaft 1, output or load shaft 3, a power transmitting differential A and an accumulator differential B and two gear drives 4 and 5. Power transmitting differential A includes two sun gears 6 and 7 that mesh with pinions 8 and 9 rotatably supported through the means of pins 10 by a spider 11 keyed to rotate with power shaft 1. Accumulator differential B includes two sun gears 12 and 13 that mesh with pinions 14 and 15 rotatably supported through the means of pins 16 and 17 by a spider 18 keyed to rotate with load shaft 3.

Gear drive 4 comprises gears 19, 20 and 21. Gear 19 is keyed to rotate with sun gear 6 through a sleeve 22 concentrically carried upon power shaft 1 and it meshes with gear 20, which, in turn, meshes with gear 21. Gear 20 is keyed to drive a shaft 23 upon which sun gear 12 is keyed. Gear 21 is keyed to a shaft 24 that carries pulley 25 of the variable speed-ratio device 26 that also includes a second pulley 27 and a belt 28. A sleeve 29 is concentrically carried upon shaft 23 and through arms 30 carries pins 16 and 17 upon which pinions 14 and 15 are rotatably mounted. Although spider 18 is keyed to rotate with load shaft 3, sun gear 13 is keyed to rotate with a sleeve 31 concentrically mounted upon shaft 3 but keyed to be driven by a gear 32 of gear driving connection 5, which also includes a gear 34 keyed to be driven by a shaft 35, there being an intermediate gear 33 disposed between gears 32 and 34 so that gear 32 will be driven in the same direction as shaft 35.

Shaft 35 concentrically carries a sleeve 36 having arms 37 and 38 for carrying pins 10 upon which pinions 8 and 9 are rotatably mounted. Pulley 27 is, of course, keyed to shaft 35 which, in turn, is keyed to sun gear 7.

While the speed-ratio device designated 26 is of the type known as the Reeves drive, it may be of any desirable form wherein the effective diameters of the pulleys may be changed by a suitable control 40. While control 40 is shown to be of a specific form, its construction is not a part of the present disclosure expect in so far as it will operate, say, a slidable pin 41 riding in a passage 42 in shaft 35 and keyed at 43 to one-half of pulley 27. This half of pulley 27 is spring-pressed toward the other half so that there is a tendency for both halves to close together. Slidable pin 41 is operated, however, to move against the closing action of spring 44 whereby the position of belt 28 may be shifted to change the effective diameters of pulleys 25 and 27.

Assuming that the effective diameters of pulleys 25 and 27 are the same: sun gears 12 and 13 will be rotated in opposite direction but at the same speed. Pinion 14 and 15 will rotate about their pins 16 and 17, but due to the same speed of rotation of sun gears 12 and 13, spider 18 and load shaft 3 will remain at rest. Assume now that the effective diameter of pulley 27 is made smaller with a corresponding increase in effective diameter of pulley 25. Pulley 27 and its sun gear 7 will operate faster than the power shaft 1. Pulley 25 and its sun gear 6 will operate slower than power shaft 1. This will result in sun gear 13 operating faster than power shaft 1 and in the same direction of rotation, while sun gear 12 will operate slower than, and in the opposite direction of, rotation of power shaft 1. This causes load shaft 3 to rotate in the same direction as power shaft 1.

If pulley 25 has its effective diameter decreased to increase its speed of rotation over pulley 27, sun gear 12 will operate faster than sun gear 13 and in opposite direction which will result in spider 18 and load shaft 3 operating in a direction opposite that of power shaft 1.

Again assume that the effective diameters of the pulleys 25 and 27 are the same and are rotating at the same speeds. Power shaft 1 will cause spider 11 to drive sun gears 6 and 7 at the same speeds and in the same direction of rotation. Through sun gear 6, gear 19 will drive gear 20 of gear drive 4 in the opposite direction of rotation but at the same speed. Sun gear 7 will drive shaft 35 at the same speed and in the same direction of rotation so as to drive gear 34 of gear drive 5 at the same speed and in the same direction of rotation. However, intermediate gear 33 will keep the direction of rotation of gear 32 the same as gear 34, thus holding the direction of rotation of sun gear 13 the same as sun gear 7 but at the same rate of speed. With both sun gears 12 and 13 of accumulator differential B rotating oppositely but at the same speed, spider 18 and load or output shaft 3 will remain at rest or in neutral position.

Causing pulley 27 to rotate faster than pulley 25, immediately causes sun gear 7 to rotate faster than sun gear 6. This will cause the increased speed of shaft 35 to increase the speed of gear 34 of gear drive 5 while causing a decrease in the speed of gear 19 of gear drive 4. This difference of speed will change the relative speeds of sun gears 12 and 13, the sun gear 12 travelling slower and thereby causing the sun gear 13, spider 18 and load shaft 3 to rotate in the same direction as power shaft 1, the degree of speed depending, of course, upon the amount of increase speed of pulley 27 over pulley 25.

When control 41 is operated to cause pulley 27 to rotate slower than pulley 25, sun gear 6 of differential gearing A will rotate faster than the opposite sun gear 7 and the shaft 35 upon which this sun gear 7 is mounted. Inasmuch as sun gear 12 of differential gearing B is driven through shaft 23 and the latter is driven by gear 20 directly meshing with gear 19 keyed to the sleeve 22 to which sun gear 6 is keyed, sun gear 12 will rotate at a faster speed than sun gear 13. It will be remembered that this latter sun gear 13 of differential gearing B is driven by sun gear 7 through shaft 35 and the gears of gear drive 5. Since sun gears 12 and 13 always travel in opposite directions, the direction of rotation of load shaft 3 is determined by the direction of the fast-moving sun gear.

It will be observed from this explanation that the torque of drive or power shaft 1 is transmitted to load shaft 3 through the two differential gearings A and B and the gear drives 4 and 5 between the same. The torque of power shaft 1 is divided at the sun gears 6 and 7 of differential gearing A. One-half of the torque is transmitted through gear drive 4, while the other half is transmitted through gear drive 5, to drive the sun gears 12 and 13 of differential gearing B. At this point the entire torque is transmitted to the spider 18 and load shaft 3. The pulleys 25 and 27 and the belt 28 of the speed-ratio device 26 are merely a bridge across divided torques transmitted through gear drives 4 and 5 so as to govern the speed ratio between them. This in turn results in a ratio change and direction of turn between power shaft 1 and load shaft 3. It must be remembered that neither of the pulleys 25 or 27 is a driver nor is driven as is the case of most pulley belt systems. As a matter of fact, if the belt 28 is removed and either of the pulleys is then turned by an outside force, the power shaft would carry the load and the loose pulley would rotate in the same ratio as if the belt were in place. It is true that in the absence of the belt a measurable amount of force would be required to rotate the pulley, thus causing it to share a part of the load; but with the belt in place, whatever pull the belt is subjected to share the load, the other pulley through the gearing furnishes an equal amount of push, thus approximately cancelling the tension on the belt.

The structure shown in FIG. 1 has the same speed-ratio changes for either direction of rotation of load shaft 3, or the same speed changes for the forward or reverse drives. Where it is desirable to have, say, the forward maximum speed greater than the reverse maximum speed, or vice versa, the structure shown in FIG. 2 may be used. To illustrate the changes and similarities in structure over FIG. 1, the same reference characters, some of which have been primed to note a slight difference, have been used for corresponding parts.

In FIG. 2 I have replaced differential gearing A with the gearing C. Gear 7' is a regular spur gear keyed to shaft 35' to rotate therewith and to mesh with a gear 9'. Gear 9' is keyed to a shaft 10' mounted to rotate in part 37' in the form of a housing having parallel walls to receive both ends of shaft 10'. The sleeve 22' extends along shaft 1' which is equivalent to sleeve 22 in FIG. 1 carrying gear 6 in keyed relation. This sleeve 22' similarly carries a corresponding gear 6' within this housing 37' to mesh with a gear 8' also keyed to shaft 10'. Gears 8' and 9' are similar to pinions 8 and 9 shown in FIG. 1.

It will be observed further that housing 37' is provided with a part 11' which corresponds to spider 11 shown in FIG. 1. This part 11' is keyed to and is driven by input or power shaft 1'. Gear 19' of gear drive 4' is keyed to rotate with sleeve 22' that is driven by gear 6'. Gear 34' is keyed to shaft 35' which is driven by gear 7'. From this description, it will be noted that the torque of input shaft 1' is divided by part 11' and housing 37' between gears 6' and 7' through gears 8' and 9' in the same manner as it is between sun gears 6 and 7 in the structure shown in FIG. 1. A portion of the torque is delivered to shaft 35' and then to gear 34' of gear drive 5'. Gear 32' meshing with gear 34' will drive sleeve 31' and sun gear 13'. The speed ratio of the forward drive with respect to the reverse drive may be easily varied in this structure in accordance with the design requirements by varying the gear ratio between gears 6' and 7', which, of course, is somewhat fixed as between sun gears 6 and 7 in FIG. 1. It will be understood that unit C may also be used in place of differential gearing B' if a greater maximum speed in the reverse direction and other effects are desirable.

The operation of the structure shown in FIG. 2 is as follows: If pulley 27' is rotated faster than pulley 25', gear 7' will rotate faster than gear 6'. This will increase the speed of shaft 35' and gear 34' while causing a decrease in the speed of gear 19'. This difference of speeds will change the relative speeds of sun gears 12' and 13', the sun gear 12' travelling slower and thereby causing the sun gear 13' to travel faster, causing spider 18' and load shaft 3' all to rotate in the same direction as power shaft 1'.

As explained before, if pulley 27' is rotated slower than pulley 25', gear 7' will rotate slower than gear 6'. The speed of gear 19' will be increased to increase the rotation of gear 20' and sun gear 12' so that its speed of rotation will be greater than sun gear 13' and will cause output shaft 3' to rotate in the same direction as that of sun gear 12', thereby reversing the direction of rotation of output shaft 3'. It will be obvious therefore that either forward or reverse drives may have different maximum speeds, depending upon what may be required in a desired design. In the embodiment shown in FIG. 2, the operation of pulleys 25' and 27' and belt 28' may be substantially the same as in FIG. 1. While control rod 41 has not been shown in FIG. 2, any suitable design of Reeves' drive may be used to accomplish the equivalent purpose.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims:

I claim:

1. A power transmission comprising a power transmitting gearing unit and an accumulator gearing unit, each having a pair of sun gears and a spider positioned between said sun gears, rotatably supported pinion means carried by each of said spiders and meshing with said sun gears, two shafts for said power transmitting gearing unit, the first of said shafts constituting the input shaft being drivingly connected to said spider of said power transmitting gearing unit, the second said shaft carrying one of the sun gears of said power transmitting gearing unit and driven thereby, a sleeve disposed about said first shaft in driving relation with the second sun gear of said power transmitting unit, two shafts for said accumulator gearing unit, the first of said last mentioned shafts being drivingly connected to one of the sun gears of said accumulator gearing unit, the second of said last mentioned shafts constituting the output shaft being connected to and driven by the spider of said accumulator gearing unit, a sleeve disposed about the second of said last mentioned shafts and fixed to the other sun gear of said accumulator gearing unit, a first driving connection between said sleeve of the power transmitting gearing unit and the first of the latter two shafts of the accumulator gearing unit to drive one of the sun gears of said accumulator gearing unit, a second driving connection between the second said shaft of the power transmitting gearing unit and the said sleeve of the accumulator gearing unit to drive the other of said sun gears of the accumulator gearing unit and variable speed regulator means bridging and connected across said two driving connections for varying the relative movements of the sun gears of said accumulator gearing unit said variable speed regulator means including two pulleys, a belt therefor and a further shaft geared to said first driving connection, one of said pulleys being connected to said further shaft and the other pulley being connected to said second shaft of said power transmitting gearing unit.

2. A power transmission comprising a power transmitting gearing unit including a drive shaft and an accumulator gearing unit including a driven shaft, each gearing unit having a power dividing sleeve and a power dividing shaft, a sun gear fixed to each of said power dividing sleeves and a sun gear fixed to each of said power dividing shafts, a planetary gear assembly drivingly connected to said drive shaft of said power transmitting gearing unit and meshing with both of the sun gears of said unit, a planetary gear assembly drivingly connected to said driven shaft of said accumulator gearing unit and meshing with both of the sun gears of that unit, a first driving connection between said power dividing sleeve of said power transmitting gearing unit and said power dividing shaft of said accumulator gearing unit, a second driving connection between said power dividing shaft of said power transmitting gearing unit and said power dividing sleeve of said accumulator gearing unit, and variable speed regulator means connected between the power dividing shaft of said power transmitting gearing unit and the power dividing shaft of said accumulator gearing unit said variable speed regulator means including a pair of pulleys, a belt therefore, and a further shaft carrying one of said pulleys and being drivingly connected to said first driving connection, the second pulley being drivingly connected to said second driving connection through said power dividing shaft of said power transmitting gearing unit.

References Cited in the file of this patent
UNITED STATES PATENTS

| | | |
|---|---|---|
| 2,117,340 | Maurer | May 17, 1938 |
| 2,384,776 | Trofimov | Sept. 11, 1945 |
| 2,647,417 | Trofimov | Aug. 4, 1953 |
| 2,745,297 | Andrus | May 15, 1956 |
| 2,895,348 | Beachler | July 21, 1959 |